United States Patent [19]

Seger

[11] 4,337,788

[45] Jul. 6, 1982

[54] HIGH PRESSURE VALVE

[75] Inventor: Fritz O. Seger, Mission Viejo, Calif.

[73] Assignee: Smith International Inc., Newport Beach, Calif.

[21] Appl. No.: 230,392

[22] Filed: Feb. 2, 1981

[51] Int. Cl.³ .............................................. F16K 43/00
[52] U.S. Cl. ................................. 137/315; 137/454.6;
166/91; 251/122; 251/333; 251/360
[58] Field of Search ............... 137/315, 454.6; 166/91,
166/97; 175/218; 251/121, 122, 318, 333, 360

[56] References Cited

U.S. PATENT DOCUMENTS

| | | | |
|---|---|---|---|
| 1,698,826 | 1/1929 | Shaffer | 166/91 |
| 1,831,713 | 11/1931 | Knowlton | 251/333 |
| 1,911,905 | 5/1933 | Knowlton | 166/91 |
| 2,014,314 | 9/1935 | Defenbaugh | 251/122 |
| 2,091,874 | 8/1937 | Neuhaus | 251/333 |
| 2,132,199 | 10/1938 | Yancey | 166/91 |
| 2,943,869 | 7/1960 | Nordin | 285/90 |
| 3,187,775 | 6/1965 | Pinnell | 251/122 |
| 4,047,695 | 9/1977 | Cleveland et al. | 251/122 |
| 4,281,678 | 8/1981 | Claycomb | 251/333 |

OTHER PUBLICATIONS

Composite Catalog, 1970–1971 Edition, Cameron Iron Works, Inc., p. 1146; Shaffer Tool Works, pp. 4342–4345.
Composite Catalog, 1970–1971 Edition, Gray Tool Company, p. 2253, I–C–I Corp., p. 2895 and Thornhill–Craver Company, pp. 4678 and 4679.
The Annin Company, Drawing Numbers 24864 and 324865, with drawing dates 4-8-60 and 2-15-57, respectively.

Primary Examiner—George L. Walton
Attorney, Agent, or Firm—Christie, Parker & Hale

[57] ABSTRACT

An erosion resistant control valve or adjustable choke has a body with a side inlet, an end outlet and a conical valve seat in alignment with the outlet. Downstream from the valve seat are a converging passage having a smaller taper than the valve seat, a cylindrical passage and a diverging passage. A stem aligned with the seat assembly includes a plug having a tapered seal surface near its upstream end for engaging the valve seat and a converging control surface downstream therefrom with the same taper as the converging passage. The smaller end of the control surface is in the cylindrical passage when the valve is closed and in the converging passage is fully open for localizing erosion downstream from the valve seat. A bleed passage relieves pressure from within the valve before the valve bonnet can be removed. The valve can be locked in a selected control setting by a split ring engaging the stem.

21 Claims, 2 Drawing Figures

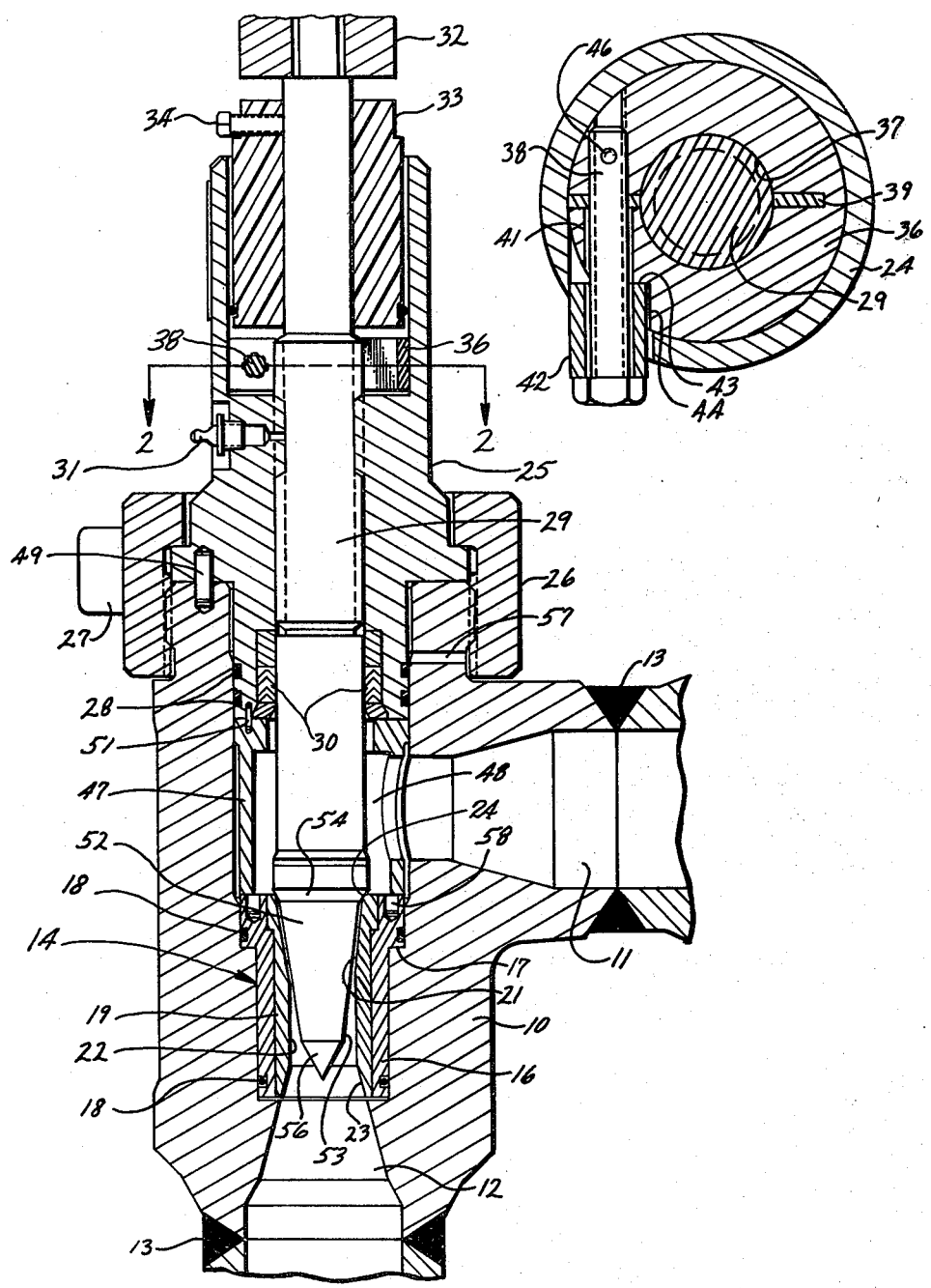

HIGH PRESSURE VALVE

FIELD OF THE INVENTION

This invention concerns an erosion resistant valve or adjustable choke particularly suited for oil field use.

BACKGROUND

High pressure valves for controlling flow are important devices in the production of oil and gas. In the trade such valves are commonly referred to as adjustable chokes. A positive choke is a fixed size orifice placed in the flow line at a wellhead, for example, to limit flow of fluid from the well. It is sometimes desirable to employ an adjustable choke so that production from the well can be controlled over a range of flow rates. Such an adjustable choke or valve is placed in the "Christmas tree" at the wellhead and set to a selected size opening corresponding to a selected size positive choke for controlling production of oil or gas from the well.

The valve may sit untended for long periods of time with prolonged exposure to corrosive environments and in many instances to extremely erosive conditions where high flow velocities and/or particles are present in the fluid flowing through the valve. When such a choke is closed, it should seat tightly so that no leakage occurs. For this reason erosion of the valve seat can be a severe problem.

It is also desirable to localize erosion in a portion of the valve that is easily replaced in the field. The flow control structure is preferably readily removable so that a different size range of choke can be substituted without removing the valve from the Christmas tree assembly. Safety is an important consideration during such maintenance of a valve. The valves are commonly used in very high pressure systems and unless the pressure inside the valve is relieved before disassembly, attempts to remove the bonnet of the valve could result in severe injury to workmen.

Thus, it is highly desirable to provide a high pressure choke giving a broad range of flow control with minimized erosion on the valve seat, safety, and ease of maintenance.

BRIEF SUMMARY OF THE INVENTION

There is, therefore, provided in practice of this invention according to a presently preferred embodiment, a high pressure valve having a side inlet and an end outlet with a removable seat assembly mounted in the valve in alignment with the outlet. The removable seat assembly includes a sleeve having an inwardly tapering valve seat at its inlet end, a converging passage having a smaller taper than the seat downstream from the valve seat and a cylindrical passage immediately downstream from the converging passage. An axially movable stem is aligned with the seat assembly including a plug having a tapered seat surface near its upstream end and a converging control surface downstream from the seat surface with the same taper as the converging passage. A removable bonnet retains the stem and limits its stroke. The stroke of the stem extends from a closed position with the seat surface of the plug engaging the valve seat on the sleeve and an open position where the flow cross section of the annulus between the control surface on the plug and the tapered passage is about the same as the flow cross section through the cylindrical passage. The length of the converging passage is less than the stroke of the stem which is less than the length of the control surface on the plug. Such arrangements assure that a vena contracta can form in fluid flowing through the valve downstream from the valve seat. Preferably, a bleed passage is provided between the inside and outside of the valve and located so that upon disassembly of the valve, pressure is relieved from within the valve before removal of the valve bonnet.

DRAWINGS

These and other features and advantages of the invention will be appreciated as the same becomes better understood by reference to the following detailed description when considered in connection with the accompanying drawings wherein:

FIG. 1 illustrates in longitudinal cross section a high pressure valve constructed according to principles of this invention; and FIG. 2 illustrates a transverse cross section of the valve at line 2—2 in FIG. 1.

DESCRIPTION

The high pressure valve has a closed die forged steel body 10 for high strength and, if desired, stainless steel can be used in this and internal parts of the valve for corrosion resistance. The valve body has an inlet passage 11 on one side and an outlet passage 12 at one end so that the fluid flowing through the valve makes a right angle turn between the inlet and outlet. Welds 13 are employed for connecting the valve body to the balance of a fluid flow system. If desired, the welds can connect flanged or threaded fittings to the valve body for removable connection of the valve into a pipe system. Alternatively, the valve body can be welded directly into a pipe system for permanent installation. Such external connections form no part of this invention and are not further illustrated.

A removable seat assembly 14 slides into the valve body in alignment with the outlet passage 12. The seat assembly comprises a support sleeve 16 that fits into the valve body and bottoms on a shoulder 17 facing upstream in the valve body. The support sleeve is sealed to the valve body by O-rings 18.

A cemented tungsten carbide liner sleeve 19 is brazed into the support sleeve and provides the throttling passage for fluid flow through the valve. The liner sleeve has a converging passage 21 having a taper of about 10° from the axis of the passage. Immediately downstream from the converging passage is a cylindrical passage 22, the diameter of which is the same as the smaller end of the converging passage and which determines the maximum choke size. Thus, for example, in a one inch adjustable choke having a control range from 11/64 inch to one inch, the diameter of the cylindrical passage is one inch. Downstream from the cylindrical passage 22 is a diverging passage 23 in the liner sleeve which aligns with the diverging outlet passage 22 through the valve body. An inwardly tapering valve seat 24 is formed at the upstream end of the liner sleeve, having a taper of about 30° from the axis of the passage. Such an angle is preferred for forming a tight seal when the valve is closed and minimizing erosion when the valve is partially open.

A valve bonnet 25 is retained on the valve body in alignment with the outlet passage by a bonnet nut 26 threaded onto the valve body. Hammer lugs 27 are provided on the bonnet nut for secure fastening and rapid disassembly. The bonnet is sealed to the valve body by a pair of high pressure O-ring seals 28, the outer one of which serves as a back-up for the inner primary seal for enhanced reliability. Each high pressure seal in the valve body comprises an O-ring and a backing ring in an O-ring groove.

A longitudinally movable valve stem 29 is threaded into the valve bonnet using acme threads, or similar threads that have a flattened crest. The valve stem is sealed to the inside of the bonnet by high pressure chevron V-ring seals 30. A grease fitting 31 is provided in the bonnet for lubricating the threads. A hand wheel 32 is connected to the outer end of the stem for adjustment of the valve. An indicator sleeve 33 is secured to the stem by a set screw 34 and bears indicia (not shown) on its outer surface for indicating the control setting or degree of opening of the valve.

A split ring 36 fits into the upper end of the bonnet below the indicator sleeve and includes an inner cylindrical surface 37 for engaging the flattened crests on the threads on the stem 29. A bolt 38 extends across the gap 39 in the split ring. The bolt is threaded into the split ring on one side of the gap and passes freely through a counterbore 41 on the other side of the gap. The head of the bolt 38 bears against a sleeve 42, the other end of which bears against a shoulder 43 at the end of a larger counterbore 44 in the split ring. The sleeve also fits through a more or less tangentially extending hole through the side of the bonnet 25. A dimple 46 is provided in the threaded portion of the bolt for receiving a nylon pellet or the like which inhibits accidental rotation of the bolt and possible loss of the bolt when not tightly engaged.

After the valve is adjusted to its desired setting the bolt 38 is tightened which causes closing of the gap 39 in the split ring. This clamps the inside surface 37 of the ring against the flattened crests of the acme threads on the stem 29. The bolt assembly cannot rotate relative to the bonnet because of the sleeve 42 fitting through the hole in the bonnet. Thus, tightening of the bolt tightly clamps the stem against rotation and prevents a change in the adjustment of the valve. The bolt is loosened when it is desired to change the valve position.

A hollow stainless steel cage 47 fits snugly between the inner end of the bonnet 25 and the upstream edge of the seat assembly 14, thereby retaining the seat assembly in place against the shoulder 17. Fluid enters the cage by way of a side opening 48 aligned with the inlet passage 11 in the valve body. The cage not only helps retain the seat assembly in place but lines the inside of the valve body in a region where erosion could otherwise be a problem. The valve bonnet is maintained in alignment with the valve body by a pin 49 and the cage is maintained in alignment with the bonnet by another pin 51 thereby assuring that the side opening 48 remains in alignment with the inlet passage.

The inner end of the stem 29 comprises a cemented tungsten carbide plug 52 having an external conical control surface 53 having the same taper (about 10°) as the converging passage 23 through the liner sleeve 19. The upstream end of the tapered control surface adjoins a conical seal surface 54 having a taper of about 30°. This seal surface on the plug engages a tapered valve seat 24 at the upstream end of the converging passage 21 through the liner sleeve 19. The valve is closed by moving the stem so that the seal surface on the plug is in tight engagement with the valve seat in the liner sleeve. When the valve is closed a slight clearance is provided between the control surface on the plug and the converging passage through the liner sleeve.

When the valve is opened by retracting the stem, the seal surface on the plug disengages from the valve seat and fluid can flow through the annulus between the tapered control surface 53 and the converging passage 21. The cross-sectional area for fluid flow through this annulus increases as the stem is retracted and control positions can readily be selected where the effective cross-sectional area is equivalent to the cross-sectional area of a circular orifice of desired diameter. The annulus between the control surface and the converging passage thereby serves as a controlled size orifice for metering fluid flow through the valve.

The downstream end of the annulus between the control surface and the converging passage has the minimum cross section for fluid flow in all control settings because these features have the same taper. Flow velocity is therefore greatest at the downstream end of the annulus. When the stem is fully retracted so that the upstream end of the plug engages the inner end of the bonnet, the cross-sectional area of the annulus between the plug and liner is about the same as the cross-sectional area for fluid flow through the cylindrical passage 22 through the liner sleeve 19.

It is desirable to localize any erosion in the liner sleeve or similar readily replaced parts of the valve assembly. A type of erosion that can occur in the high pressure choke is due to high velocity fluid flow through the flow limiting orifice. In a high pressure gas well, for example, sonic velocities in the region of the orifice can occur. High velocity flow and entrained particles can cause severe erosion in an adjustable choke, one type of which is known as "wire lining". In this type of erosion flow perturbations cause grooves to form extending in a direction parallel to the direction of flow. Once commenced such grooves tend to increase in depth and a deeply corrugated surface can result. These grooves appear as if an abrasive wire had been drawn along the surface exposed to flow, hence, the term "wire lining". In a conventional adjustable choke such erosion can prevent tight closing of the valve.

In a control valve as provided in practice of this invention it is found that any erosion of the liner sleeve occurs in regions downstream from the conical valve seat. Because the cone angle in the annulus is significantly smaller than the angle on the valve seat, the seal surface on the plug moves away from the valve seat a substantial distance with only a small valve opening. This keeps fluid velocity relatively low in the region of the seat and minimizes erosion of the seat. An angle of about 10° on the plug and in the converging passage assures close control of valve setting without undue stroke length and also moves the seat surfaces apart enough to prevent appreciable erosion. When wire lining occurs in a valve, it commences just downstream from the seat and surprisingly little, if any, erosion is found on the seat. This is quite desirable since there is no impairment to complete closure of the valve.

The length of the converging passage 21 through the liner is less than the stroke of the valve stem between the fully opened and fully closed positions and the control surface 53 on the plug is longer than the stroke of the valve stem. This assures that at least a portion of the tapered plug is within the converging passage in the liner at all control positions. Since the tapers on the plug and converging passage are the same, the cross-sectional area for fluid flow through the annulus continually decreases and the flow velocity continually increases. A vena contracta can form in the fluid flowing through the valve orifice. Because of the configuration of the plug and liner sleeve, such a vena contracta can form only in locations downstream from the valve seat.

When the valve is opened a small amount, the downstream end of the plug is downstream from the beginning of the cylindrical passage 22 through the liner. A vena contracta can form near the upstream portion of the cylindrical passage. When the valve is opened an intermediate amount, the downstream edge of the control surface is in the converging passage and a vena contracta can form in the converging passage downstream from the conical seat.

When the valve is fully open the downstream edge of the conical control surface is just downstream from the valve seat. The flow cross section between the plug and the upstream end of the converging passage is about the same as the flow cross section through the cylindrical passage. The passage therefore acts much like a positive choke when the valve is fully open. A vena contracta could form near an upstream portion of the converging passage or in the cylindrical passage 22 which can act as a short tube orifice. It is believed that wire lining and similar erosion is most severe in the region of the vena contracta and throughout the control settings of the valve such a vena contracta can form downstream from the conical valve seat, leaving that surface in good condition.

It is also desirable that the length of the control surface 53 on the plug be less than the combined length of the converging passage 21 and cylindrical passage 22 through the liner so that erosion of the valve body downstream from the liner is essentially eliminated. A conical tip 56 on the plug helps minimize abrupt changes in flow direction and minimize erosion downstream from the liner.

The adjustable choke is readily and safely disassembled by removing the bonnet 25. A bleed passage 57 is provided through the valve body just outside the backup seal 28 between the bonnet and valve body. The position of the bleed passage is behind the bonnet nut 26 so that when the valve is fully assembled, the nut inhibits accumulation of foreign materials in the passage. Further, the length of thread in the nut is longer than the distance from the bleed passage to the inner primary seal 28 between the bonnet and valve body. This provides a significant safety feature in the event a workman attempts to disassemble the valve without relieving internal fluid pressure within the valve.

As the bonnet nut is unscrewed from the valve body the edge of the nut clears the opening of the bleed passage. Internal pressure, if any, within the valve would tend to force the bonnet away from the valve body along with the bonnet nut as the nut is unscrewed. However, the high pressure seals 28 move past the bleed passage 57 before the threads on the bonnet nut become disengaged from the threads on the valve body. Thus, any high pressure fluid in the valve body can be vented safely through the bleed passage 57 while the nut still retains the bonnet on the valve. This prevents the bonnet from being violently dislodged from the valve in case of inadvertent disassembly with high internal pressure in the valve.

It will also be noted that the bleed passage 50 is on the same side of the valve as the inlet passage 11. This assures that any fluid ejected through the bleed passage is directed along the pipe connecting the valve with other portions of the system. This is the least likely place for a workman to be exposed to a jet of fluid from the bleed passage.

Once the bonnet nut has been removed, disassembly of the valve is quite easy. The cage 47, if not withdrawn with the bonnet by reason of the pin 51, can be readily pulled from the valve body by any hooked tool. The seat assembly 14 can be pulled directly from the valve body by engaging one or more threaded holes 58 in the support sleeve 16 with a threaded rod or the like. The reverse of the disassembly procedure is clearly of equal ease.

Although but one embodiment of high pressure choke constructed according to principles of this invention has been described and illustrated herein, many modifications and variations will be apparent to those skilled in the art. For example, in the embodiment described and illustrated a threaded stem in the bonnet is adjusted by means of a hand wheel. If desired, an unthreaded stem can be used for longitudinal motion by a standard mechanical actuator. It will also be apparent that with the same basic structure, various adjustable choke size ranges can be provided merely by changing the diameters of the liner passages and plug. Many other modifications and variations will be apparent to those skilled in the art and it is therefore to be understood that within the scope of the appended claims the invention may be practiced otherwise than as specifically described.

What is claimed is:
1. A valve comprising:
   a valve body having a side inlet passage and an end outlet passage;
   a seat assembly mounted in the valve body between the inlet and outlet passages, the assembly comprising a sleeve having:
      an inwardly tapering valve seat in the body in alignment with the outlet passage;
      a conical converging passage having a smaller taper than the valve seat downstream from the valve seat;
      a cylindrical passage immediately downstream from the converging passage and having the same diameter as the smaller end of the converging passage; and
      a diverging passage downstream from the cylindrical passage;
   an axially movable stem aligned with the outlet passage including a plug having a tapered seal surface near its upstream end for engaging the valve seat and a conical control surface downstream from the seal surface with the same taper as the converging passage; and
   means for moving the stem between a closed position with the seal surface on the plug engaging the valve seat and a fully open position with the seal surface on the plug spaced apart from the valve seat, the downstream end of the control surface being within the cylindrical passage when the stem is in its closed position, and within the converging passage when the stem is in its fully open position and in some intermediate positions of the valve at least portions of the control surface are in the converging and cylindrical passages.

2. A valve as recited in claim 1 including a clearance between the control surface and the converging passage when the seal surface engages the valve seat.

3. A valve as recited in claim 1 wherein the length of the control surface is greater than the length of the converging passage and greater than the length of the stroke of the stem between the open and closed positions so that a vena contracta of fluid flowing through the valve can occur downstream of the valve seat in all positions of the valve stem between the open and closed positions.

4. A valve as recited in claim 3 wherein the length of the converging passage in the sleeve is less than the stroke of the stem between the fully open and closed positions.

5. A valve as recited in claim 4 wherein the angle of the tapered control surface and the angle of the converging passage are each about 10°.

6. A valve as recited in claim 5 wherein the taper on the valve seat and the taper on the seal surface are each about 30°.

7. A high pressure valve comprising:
a valve body having a side inlet passage and an end outlet passage;
a removable seat assembly mounted in the body between the inlet and the outlet passages and in alignment with the outlet passage, the seat assembly including a sleeve having an inwardly tapering valve seat at its inlet end, a conical converging passage having a smaller taper than the valve seat downstream from the valve seat, and a cylindrical passage immediately downstream from the converging passage;
a diverging passage downstream from the cylindrical passage;
an axially movable stem aligned with the seat assembly, including a plug having a tapered seal surface near its upstream end for engaging the tapering valve seat on the sleeve, and a conical converging control surface downstream from the seal surface with the same taper as the converging passage; and
means for moving the stem between a closed position with the seal surface on the plug engaging the valve seat in the sleeve and a fully open position where the minimum flow cross section of the annulus between the control surface on the plug and the converging passage is about the same as the flow cross section through the cylindrical passage; and wherein
the length of the control surface is greater than the length of the converging passage and greater than the length of the stroke of the stem between the fully open and closed positions so that a vena contracta of fluid flowing through the valve can occur in the cylindrical passage or the converging passage downstream from the valve seat in substantially all positions of the valve stem between the fully open and the closed positions and including the fully open position.

8. A valve as recited in claim 7 wherein the length of the converging passage in the sleeve is less than the stroke of the stem between the fully open and the closed positions.

9. A valve as recited in claim 8 wherein the angle of the tapered control surface and the angle of the converging passage are each about 10°.

10. A valve as recited in claim 7 wherein the removable seat assembly comprises a support sleeve slidably fittable into the valve body; an erosion resistant sleeve liner in the support sleeve and including the seat surface, converging passage and cylindrical surface; the sleeve liner also including at least a portion of the diverging passage downstream from the cylindrical passage; and means for sealing between the support sleeve and valve body.

11. A valve as recited in claim 10 further comprising a generally conical tip on the plug downstream from the smaller end of the control surface.

12. A valve comprising:
a valve body having a side inlet passage and an end outlet passage;
a removable seat assembly mounted in the body in alignment with the outlet passage including an erosion resistant sleeve having an inwardly tapering valve seat at its inlet end, a conical converging passage having a smaller taper than the valve seat downstream from the valve seat and a cylindrical passage immediately downstream from the converging passage having the same diameter as the smaller end of the converging passage;
a diverging passage downstream from the cylindrical passage;
an axially movable stem aligned with the seat assembly including an erosion resistant plug having a tapered seal surface near its upstream end having the same taper as the valve seat and a converging conical control surface downstream from the seal surface with the same taper as the converging passage;
wherein the length of the control surface is greater than the length of the stroke of the stem between a closed position with the seal surface on the plug engaging the tapering valve seat in the sleeve and the smaller end of the control surface within the cylindrical passage, and a fully open position wherein the smaller end of the control surface is within the converging passage.

13. A valve as recited in claim 12 wherein the length of the converging passage is shorter than the stroke of the stem and the total length of the converging passage and the cylindrical passage is greater than the length of the control surface on the plug so that a vena contracta of fluid flowing through the valve can occur in the liner sleeve downstream from the valve seat in all positions of the valve stem between the closed position and the fully open position.

14. A valve as recited in claim 13 wherein the sleeve liner also includes at least a portion of the diverging passage immediately downstream from the cylindrical passage.

15. A valve as recited in claim 13 wherein the angle of the taper on the control surface and the angle in the converging passage are each about 10°.

16. A valve as recited in claim 15 including a clearance between the control surface and the converging passage when the seal surface engages the valve seat.

17. A high pressure adjustable choke comprising:
a valve body having a side inlet passage and an end outlet passage having a diverging portion;
a removable seat assembly mounted in the body in alignment with the outlet passage, including a support sleeve slidably fitted into the valve body; means for sealing between the support sleeve and the valve body; and an erosion resistant sleeve having a conical valve seat tapering inwardly at an angle of about 30° at its inlet end, a conical converging passage having a taper of about 10° downstream from the valve seat, a cylindrical passage immediately downstream from the converging passage, and a diverging passage immediately downstream from the cylindrical passage aligned with the diverging portion of the outlet passage;

an axially movable stem aligned with the seat assembly, including an erosion resistant plug having a conical seal surface near its upstream end having a taper of about 30° for engaging the valve seat in the sleeve and a converging conical control surface downstream from the seal surface with the same taper as the converging passage;

means for moving the stem between a closed position with the seal surface on the plug engaging the valve seat in the sleeve and a fully open position wherein the smaller end of the control surface is within the converging passage, the flow cross section of the annulus between the control surface of the plug and the converging passage in the fully open position being about the same as the flow cross section through the cylindrical passage and including a clearance between the control surface and the converging passage when the seal surface engages the valve seat;

the length of the control surface being greater than the length of the converging passage and greater than the length of the stroke of the stem between the open and closed positions, the length of the converging passage in the sleeve being less than the stroke of the stem between the open and closed positions, and the total length of the converging passage and the cylindrical passage being greater than the length of the control surface on the plug so that a vena contracta of fluid flowing through the valve can occur in the liner sleeve downstream from the valve seat in all positions of the valve stem between the closed position and the fully open position and including the fully open position;

a removable bonnet surrounding the stem for retaining the stem in the valve body;

a seal between the valve bonnet and the valve body; and a removable cage between the bonnet and seat assembly lining the valve body and including a side opening aligned with the inlet passage.

18. A choke as recited in claim 17 further comprising:
means for retaining the bonnet on the valve body; and
a bleed passage between the inside of the valve body and the outside of the valve body outside the seal between the valve bonnet and the valve body on the same side of the valve body as the inlet passage and located so that upon disassembly of the valve the seal can pass the bleed passage before the bonnet is disconnected from the valve body for bleeding fluid from the valve body before removal of the bonnet.

19. A valve as recited in claim 18 wherein the means for retaining the valve bonnet on the valve body comprises a bonnet nut threaded onto the valve body, the bleed passage being within the bonnet nut when the bonnet nut is fully secured to the valve body, and the length of the threaded engagement between the bonnet nut and valve body being greater than the distance between the seal on the valve bonnet when assembled on the valve body and the bleed passage.

20. A choke as recited in claim 17 further comprising:
a threaded connection between the stem and valve bonnet, the threads on the stem having flattened crests;
a split ring surrounding a portion of the stem having a cylindrical inside surface;
means for preventing rotation of the split ring relative to the valve bonnet; and
means for partially closing the split ring and clamping the inside surface against the crests of the threads on the stem for locking the stem in a selected axial position.

21. A choke as recited in claim 17 further comprising a gradually converging tip on the plug downstream from the smaller end of the control surface.

* * * * *

UNITED STATES PATENT AND TRADEMARK OFFICE
CERTIFICATE OF CORRECTION

PATENT NO. : 4,337,788
DATED : July 6, 1982
INVENTOR(S) : Fritz O. Seger

It is certified that error appears in the above—identified patent and that said Letters Patent is hereby corrected as shown below:

Column 6, line 52, -- converging -- should be inserted between "conical" and "control".

Signed and Sealed this

Fifth Day of October 1982

[SEAL]

Attest:

GERALD J. MOSSINGHOFF

Attesting Officer   Commissioner of Patents and Trademarks